United States Patent [19]

Hasegawa et al.

[11] Patent Number: 4,919,515
[45] Date of Patent: Apr. 24, 1990

[54] SCREEN FOR A REAR PROJECTION TYPE TELEVISION SET

[75] Inventors: Shinichi Hasegawa; Masaaki Hanyu, both of Tokyo, Japan

[73] Assignee: Pioneer Electronic Corporation, Tokyo, Japan

[21] Appl. No.: 242,948

[22] Filed: Sep. 9, 1988

[30] Foreign Application Priority Data

Feb. 19, 1988 [JP] Japan .................................. 63-35364

[51] Int. Cl.$^5$ ............................................. G03B 21/60
[52] U.S. Cl. ..................................................... 350/128
[58] Field of Search ................................. 350/127–129

[56] References Cited

U.S. PATENT DOCUMENTS 4,752,116  6/1988  Sekiguchi ............................. 350/128

Primary Examiner—Richard A. Wintercorn
Attorney, Agent, or Firm—Finnegan, Henderson, Farabow, Garrett and Dunner

[57] ABSTRACT

A screen for a rear projection type television set including a Fresnel sheet and a lenticular sheet. Horizontal diffusion of projection light is carried out by a plurality of lenticular lenses which are arranged on the incident surface of the lenticular sheet in parallel with black stripes arranged on the emergent surface of the lenticular sheet. Vertical diffusion of the projection light is effected by a plurality of spherical or aspherical lenticular lenses which are arranged on the incident surface of the Fresnel sheet in a direction perpendicular to the pitch direction of the lenticular lenses formed on the lenticular sheet. This configurations provides a large visual field angle in both the horizontal and vertical directions.

12 Claims, 4 Drawing Sheets

SCREEN FOR A REAR PROJECTION TYPE TELEVISION SET

BACKGROUND OF THE INVENTION

This invention relates to a screen for a rear projection type television set in which an image is projected onto a screen from a projection tube behind the screen and the image projected onto the screen is observed from the front of the screen.

In a projection television set of this type, the projection image is diffused by the screen to provide a certain visual field angle when viewed from the front of the screen so that a substantially bright image can be observed even from an oblique angle.

FIG. 8 shows the fundamental arrangement of the above-described rear projection type television set. In FIG. 8, reference numeral 3 designates a projector that may comprise a CRT projection tube and a projection lens, reference numeral 4 designates a screen made up of a Fresnel sheet 41 disposed adjacent to the projector 3, and reference numeral 42 designates a lenticular sheet (generally called "a lenticular lens") disposed adjacent to the emergent surface of the Fresnel sheet 41.

A Fresnel lens 41a is formed on the emergent surface of the Fresnel sheet 41, and a number of lenticulars 42a are formed on the incident surface of the lenticular sheet 42 arranged at predetermined intervals along the horizontal direction of the screen (i.e., in a direction perpendicular to the surface of the drawing). The projection light from the projector 3 emerges onto the front surface of the screen 4 passing through the Fresnel sheet 41 and the lenticular sheet 42.

In this configuration, the projection light from the projector 3 is converged into parallel rays by the Fresnel lens 41a formed on the emergent surface of the Fresnel sheet 41, and the parallel rays are diffused horizontally by the lenticulars 42a formed on the incident surface of the lenticular sheet 42, so that the directional angle of the emergent light from the lenticular sheet 42 is increased in a horizontal direction. Further, a diffusing agent is mixed in the Fresnel sheet 41 and/or the lenticular sheet 42 to diffuse the projection light in the vertical direction. Thus, the emergent light from the screen 4 has a directional angle in both the horizontal and vertical directions which increases the visual field angle in both the horizontal and vertical directions to some extent when viewed from the front of the screen. In practice, the ordinary visual field angle is ±40° and ±5° in the horizontal and vertical direction, respectively, depending upon the position of observation of the projection television set.

The reason why the visual field angle is large in the horizontal direction and small in the vertical direction is that the vertical diffusion is effected by mixing the diffusing agent. Specifically, if the quantity of diffusing agent is increased, then the transmittance is decreased, as a result, the contrast is lowered and the projected image becomes foggy; that is, the resolving power is reduced. Therefore, the quantity of diffusing agent to be mixed is limited. This limitation limits the increase of the directional angle of diffusion in the vertical direction.

The diffusion characteristic of a diffusing agent is isotropical. Therefore, the diffusion action is effected in the horizontal direction, in which the diffusion is sufficiently carried out with the aid of the lenticular sheet. Thus, for the entire screen, the diffusion efficiency is low.

If the quantity of diffusing agent is increased, then the output of the CRT projection tube may be increased in order to prevent the aforementioned lowering. However, this method is disadvantageous in that the service life (or durability) of the CRT projection tube is decreased and output loss is increased because, as described above, the diffusion is effected in an unwanted direction due to the diffusion characteristic of the diffusing agent.

If, on the other hand, the quantity of diffusing agent to be mixed is decreased, then the visual field angle in the vertical direction is decreased and the diffusion of light in the Fresnel sheet 41 is decreased. Therefore, the projection light, which has been partially reflected by the emergent surface of the Fresnel lens 41a, is reflected by the incident surface of the Fresnel lens 41a which forms a ghost image of the projection image on the screen 4.

SUMMARY OF THE INVENTION

Accordingly, an object of the present invention is to provide a screen for a rear projection type television set which overcomes the above-described difficulties accompanying a conventional rear projection type television.

A further object of the present invention is to provide a screen for a rear projection type projection television set capable of maintaining high contrast, resolving power and luminance.

A further object of the present invention is to provide a screen for a rear projection type projection television set having an increased visual field angle in both the horizontal and vertical directions.

The foregoing objects and other objects of the invention have been achieved by providing a screen for a rear projection type television set, comprising a Fresnel sheet for receiving a projection image from a projector, including a plurality of first lenticular lenses, spherical or aspherical in profile, formed on an incident surface of the Fresnel sheet and arranged in a first direction, and a Fresnel lens formed on an emergent surface of the Fresnel sheet, and a lenticular sheet, disposed adjacent to the Fresnel sheet, including a plurality of second lenticular lenses formed on an incident surface of the lenticular sheet and arranged in a second direction perpendicular to the first direction, and a plurality of black stripes arranged on an emergent surface of the lenticular sheet and having the same pitch and being arranged in the same direction as the second lenticular lenses.

BRIEF DESCRIPTION OF THE DRAWINGS

The objects and features of the present invention will become apparent from the following detailed description when read in conjunction with the accompanying drawings, wherein.

DETAILED DESCRIPTION OF THE INVENTION

One embodiment of a screen for a rear projection type television set according to the present invention will be described with reference to the accompanying drawings.

Figure 1:
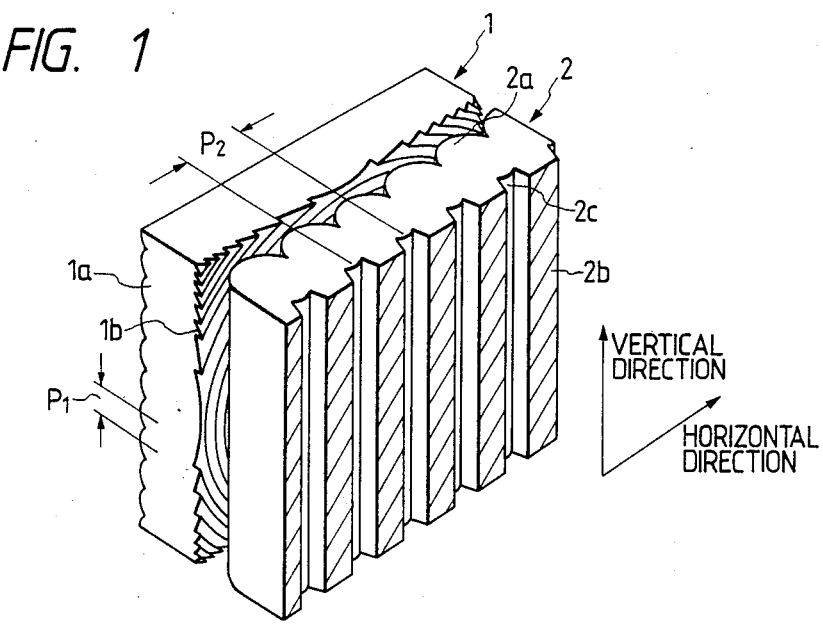
FIG. 1 is a perspective view showing one example of a screen for a rear projection type projection television set according to the present invention.
Figure 2A:
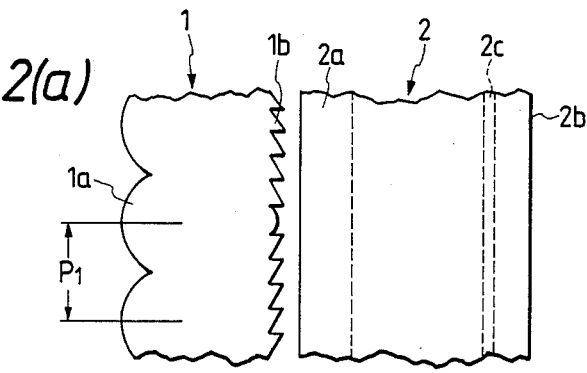
FIGS. 2(a) and 2(b) are sectional views of the screen shown in FIG. 1.
Figure 2B:
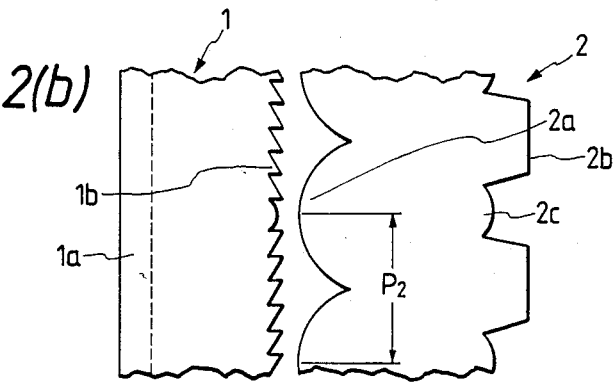

The screen of the invention, as shown in FIGS. 1 and 2, comprises a Fresnel sheet 1 which, when the screen is set on a rear projection type television set, faces the projector and a lenticular sheet 2 that faces the emergent surface of the Fresnel sheet 1 and functions as a screen surface.

First lenticular lenses 1a are formed on the incident surface of the Fresnel sheet 1 having a pitch in the vertical direction of the screen, and a circular Fresnel lens 1b is formed on the emergent surface of the Fresnel sheet 1. The surfaces of the first lenticular lenses 1a are mirror-finished in order to prevent irregular reflection or diffusion generally attributed to rough surfaces thereby greatly reducing the loss in the optical intensity of a projected image and the occurrence of a foggy image projection.

Second lenticular lenses 2a are formed on the incident surface (facing the Fresnel sheet 1) of the lenticular sheet 2 having a pitch in the horizontal direction of the screen. Black stripes 2b are formed (for example by painting) on the emergent surface of the lenticular sheet 2 having the same pitch in the horizontal direction as the second lenticular lenses 2a and having grooves therebetween. The bottoms of the grooves are formed into third lenticular lenses 2c which are smaller in width than the second lenticular lenses 2a.

The second lenticular lenses 2a, the black stripes 2b, and the third lenticular lenses 2c are arranged such that the optical axes of the second lenticular lenses 2a coincide with those of the third lenticular lenses 2c.

The pitch $P_1$ of the first lenticular lenses 1a of the Fresnel sheet 1 is selected to be less than ⅓ of the pitch $P_2$ of the second lenticular lenses 2a of the lenticular sheet 2; that is, it is selected such that no moire is formed by the first and second lenticular lenses 1a and 2a or by the black stripes 2b and the Fresnel lens 1b.

The projection light from the projector is diffused vertically by the refraction of the first lenticular lenses 1a formed on the incident surface of the Fresnel lens 1. The light thus diffused is converged in a macromode by the Fresnel lens 1b according to the direction of incidence of the projection light, which is applied to the first lenticular lenses 1a.

Figure 3A:
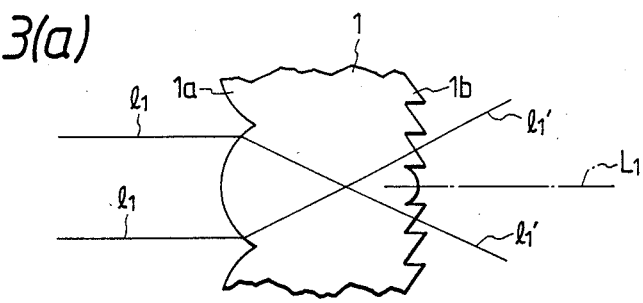
FIGS. 3(a) and 3(b) are diagrams for describing the diffusion of projection light by the Fresnel sheet of the screen.

As shown in FIG. 3(a), when the incident position of the projection light is near the center of the screen, and the projection light is a bundle of rays $l_1$ substantially perpendicular to the Fresnel sheet 1, the projection light diffused vertically by the first lenticular lens 1a is not refracted by the Fresnel lens 1b in a macro mode, but in a micro mode, the rays $l_{1'}$ are diffused vertically with the optical axis $L_1$ being substantially perpendicular to the Fresnel sheet 1.

Figure 3B:
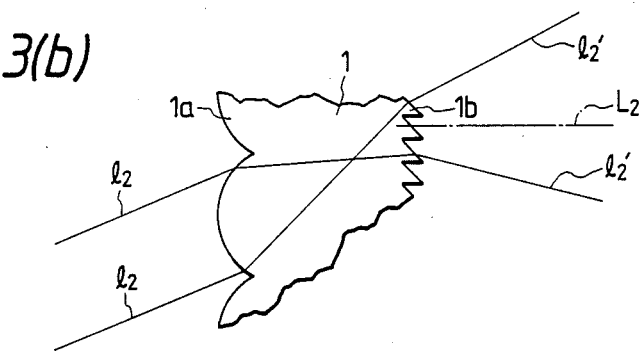

Further, as shown in FIG. 3(b), when the incident position of the projection light is near the periphery of the screen, and the projection light is a bundle of rays $l_2$ which are obliquely applied to the Fresnel sheet 1, the rays diffused vertically by the first lenticular lens 1b are refracted by the Fresnel lens 1a in a macro mode, and, in a micro mode, provides rays $l_{2'}$ which are diffused vertically with the optical axis $L_2$ again being substantially perpendicular to the Fresnel sheet 1.

The projection light diffused vertically and converged in a macro mode as described above is diffused horizontally by the refraction of the second lenticular lenses 2a formed on the incident surface of the lenticular sheet 2, and is allowed to emerge from the third lenticular lenses 2c formed between the black stripes 2b.

Thus, as described above, the projection light is diffused vertically and horizontally by the first lenticular lenses 1a and the second lenticular lenses 2a, respectively. This allows the visual field angle of the screen to be increased both in a horizontal direction and in a vertical direction without using a large quantity of diffusing agent.

Figure 4:
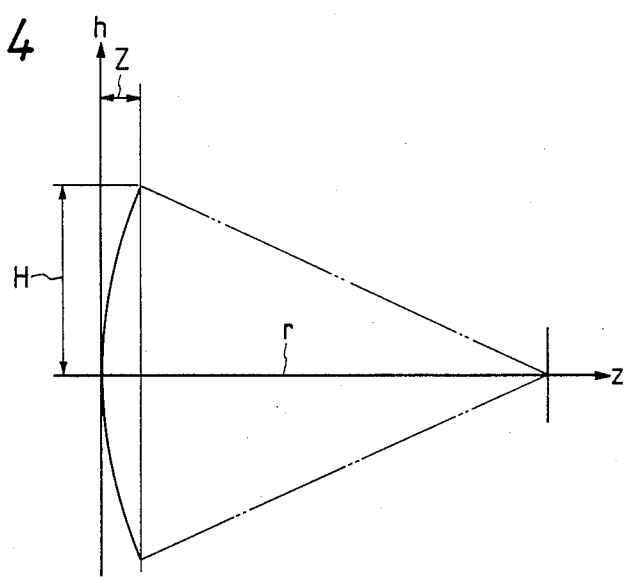
FIG. 4 is a diagram showing one period of the profile of first lenticular lenses in the screen of the invention.

FIG. 4 shows one period of the profile of the first lenticular lenses 1a described above. In FIG. 4, reference character H designates the half period, Z the lenticular depth, and r the paraxial radius.

The aspherical profile of the lenticular lens 1a can be represented by the section of a rotationally symmetric aspherical surface in a general aspherical lens which is a curve represented by the following equation:

$$z = \frac{C h^2}{1 + \sqrt{1 - (K + 1) C^2 h^2}} + \sum_{i=2}^{5} A_{2i} h^{2i}$$

in a quadratic plane in which the h-axis and the z-axis correspond to the direction of H and Z, respectively, where C is the reciprocal of the paraxial radius r, K is a conical constant, and $A_4$, $A_6$, $A_8$ and $A_{10}$ are high order aspherical coefficients.

The numerical data is listed in the following Examples 1, 2 and 3: In Example 1, the lenticular lens is spherical, and in Examples 2 and 3, the lenticular lens is aspherical and the high order aspherical coefficient $A_{2i}$ (i=2, .... and 5) is zero (0).

EXAMPLE 1

C=3.00 mm$^{-1}$ H=0.1 mm Z/H=0.1962 K=7

EXAMPLE 2

C=3.75 mm$^{-1}$ H=0.1 mm Z/H=0.1946

EXAMPLE 3

C=4.50 mm$^{-1}$ H=0.1 mm Z/H=0.1984 K=−4

In the above-described embodiment, the first lenticular lenses 1a are so formed as to satisfy the following condition:

0.10≦Z/H≦0.37.

If Z/H exeeds the upper limit, the peak luminance is lowered, and if it is below the lower limit, then the effect is substantially the same as that where the incident surface of the Fresnel sheet is flat.

Figure 5:
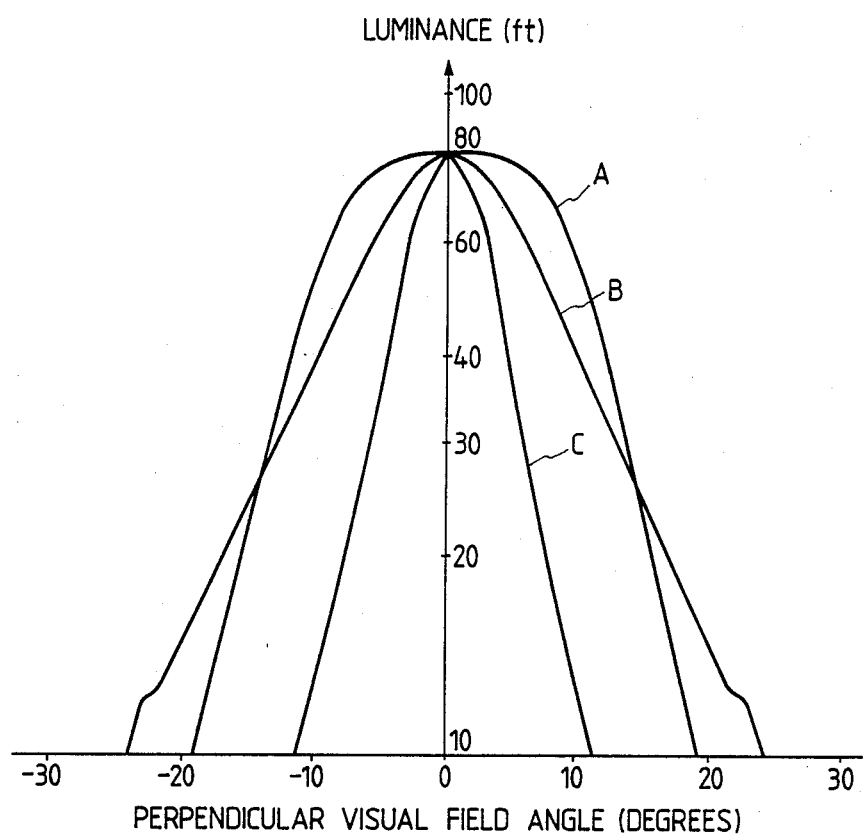
FIG. 5 is a graphical representation for comparison of the vertical diffusion characteristic of the screen of the present invention with those of conventional screens.

FIG. 5 is a graphical representation indicating projection light intensity depending on vertical visual field angle, for comparison of the vertical diffusion characteristic of the screen of the present invention with conventional screens. In FIG. 5, curve A corresponds to the screen in the above-described Example 3, curve B corresponds to a conventional screen in which the incident surface of the Fresnel sheet is flat and a large quantity of diffusing agent is employed, and curve C is for a conventional screen in which the incident surface of the Fresnel sheet is flat and a small quantity of diffusing agent is employed.

As is apparent from curves C and B, when the quantity of diffusing agent to be mixed is increased, the visual field angle having a predetermined luminance is increased. However, as shown by the spread at the base of the curve, as the visual field angle is increased, the projection light is diffused over an excessivley large region such that the center of the visual field angle is much different in luminance from the edges of the visual field angle.

On the other hand, as is apparent from curve A, with a screen of the present invention according to Example 3 in which the first lenticular lenses 1a of the Fresnel sheet 1 are made spherical or aspherical, and with the directivity of diffusion being adjusted by the pitch and the profile of the lenses 1a, optical loss due to increased visual field angle is decreased such that the screen is substantially uniform in luminance.

Accordingly, with the screen of the present invention, increased visual field angle can be obtained without increasing the output of the projector.

Generally, three-tube horizontally juxtaposed projectors in which red, green and blue cathode ray tubes are horizontally juxtaposed, are used for projection television sets. These projectors have a disadvantage in that a horizontal color shift is caused on the screen because the three tubes have different emergent points. The color shift remains even after the projection light is converted into a bundle of parallel rays by the Fresnel sheet in a macro mode. The present invention overcomes this disadvantage by correcting the color shift using the refraction of the second and third lenticular lenses 2a and 2c of the lenticular sheet 2.

Further, due to recent increases in screen size and decreases in depth of projection television sets which increases the angle of view of the projecting lens, it may be necessary to increase the angle of the Fresnel lens emergent surface to improve the characteristic of optical convergence.

An example of how the present screen reduces the possibility of forming ghost images will now be described in conjunction with FIGS. 6 and 7.

Figure 7:
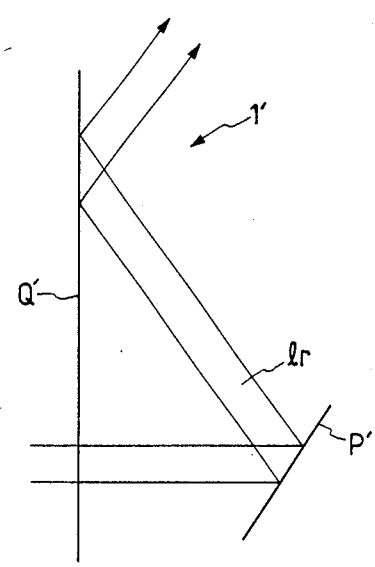
FIG. 7 is a diagram showing formation of a ghost image by a conventional screen.
Figure 8:
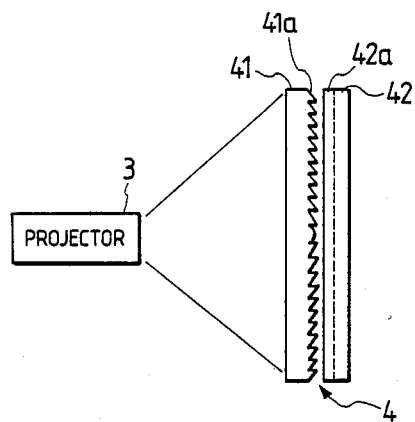
FIG. 8 is a diagram showing the fundamental arrangement of a conventional rear projection type television set.

In a conventional screen, as shown in FIG. 7, the reflection light lr, which is formed when the incident light is reflected by the emergent surface P' of the Fresnel sheet 1', is applied to the incident surface Q' of the Fresnel sheet 1' at a small angle thereto, and the light reflected as a beam of light in a predetermined direction from the incident surface Q' forms the ghost image of the image projected onto the periphery of the screen.

Figure 6:
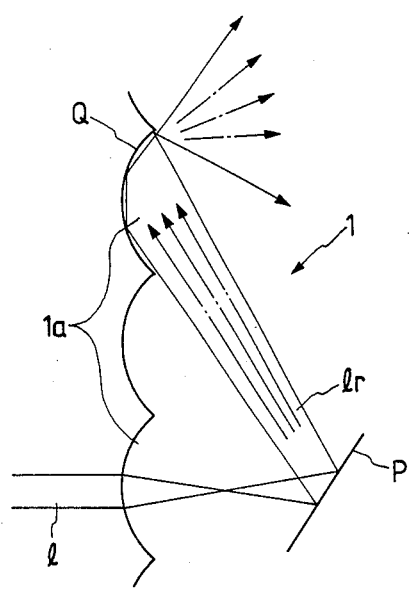
FIG. 6 is a diagram showing the ability of the screen of the present invention to reduce the possibility of forming a ghost image.

On the other hand, with a screen of the present invention, as shown in FIG. 6, since the lenticular lenses 1a are formed on the incident surface Q of the Fresnel sheet 1, the projection light l is diffused by the refraction of the lenticular lenses 1a, and the light lr reflected from the emergent surface P of the Fresnel sheet 1 is diffused by reflection from the curved surface of the lenticular lens 1a, which reduces the possibility of forming a ghost image.

Thus, in the screen of the present invention, horizontal diffusion is carried out by means of the lenticular lenses arranged horizontally on the lenticular sheet, while vertical diffusion is carried out by means of the spherical or aspherical lenticular lenses arranged vertically on the Fresnel sheet. Therefore, it is unnecessary to use a large quantity of diffusing agent in manufacturing the screen. Accordingly, the screen of the present invention provides high contrast, resolving power and luminance, and has a large visual field angle in both the horizontal and vertical directions.

Further, since the light reflected inside the Fresnel sheet is diffused by the lenticular lenses formed on the incident surface of the Fresnel sheet, the possibility of forming ghost images is significantly reduced.

While the present invention has been described in terms of the foregoing embodiments, it should be understood that modifications may be made thereto without departing from the spirit and scope of the invention as defined in the appended claims.

What is claimed is:

1. A screen for a rear projection type television set, comprising:

a Fresnel sheet for receiving a projection image from a projector, said Fresnel sheet including a plurality of first lenticular lenses, spherical or aspherical in profile, formed on an incident surface of said Fresnel sheet and arranged in a first direction, and a Fresnel lens formed on an emergent surface of said Fresnel sheet;

a lenticular sheet, disposed adjacent to said Fresnel sheet, including a plurality of second lenticular lenses formed on an incident surface of said lenticular sheet and arranged in a second direction perpendicular to said first direction, and a plurality of black stripes arranged on an emergent surface of said lenticular sheet and having the same pitch and being arranged in the same direction as said second lenticular lenses; and said first lenticular lenses meeting the following conditions:

$$0.10 \leq Z/H \leq 0.37$$

where $Z/H$ is a ratio of a half period ($H$) of said first lenticular lenses to a lenticular depth ($Z$) of said first lenticular lenses.

2. A screen as claimed in claim 1, wherein said first lenticular lenses have a mirror-finished surface.

3. A screen as claimed in claim 1, wherein said lenticular sheet further includes a plurality of third lenticular lenses formed on said emergent surface of said lenticular sheet, each third lenticular lens being alternately disposed between adjacent black stripes.

4. A screen as claimed in claim 3, wherein said plurality of third lenticular lenses are arranged to have a pitch equal to the pitch of said second lenticular lenses.

5. A screen as claimed in claim 3, wherein said plurality of third lenticular lenses are respectively disposed at the bottom of grooves formed between said plurality of black stripes.

6. A screen as claimed in claim 3, wherein said third lenticular lenses are smaller in width than said second lenticular lenses.

7. A screen for a rear projection type television set, comprising:

a Fresnel sheet for receiving a projection image from a projector, said Fresnel sheet including a plurality of first lenticular lenses, spherical or aspherical in profile, formed on an incident surface of said Fresnel sheet and arranged in a first direction, and a Fresnel lens formed on an emergent surface of said Fresnel sheet; and a lenticular sheet, disposed adjacent to said Fresnel sheet, including a plurality of second lenticular lenses formed on an incident surface of said lenticular sheet and arranged in a second direction perpendicular to said first direction, and a plurality of black stripes arranged on an emergent surface of said lenticular sheet and having the same pitch and being arranged in the same direction as said second lenticular lenses;

wherein a pitch of said first lenticular lenses of said Fresnel sheet is less than $\frac{1}{3}$ of a pitch of said second lenticular lenses of said lenticular sheet.

8. A screen as claimed in claim 7, wherein said first lenticular lenses have a mirror-finished surface.

9. A screen as claimed in claim 7, wherein said lenticular sheet further includes a plurality of third lenticular lenses formed on said emergent surface of said lenticular sheet, each third lenticular lens being alternately disposed between adjacent black stripes.

10. A screen as claimed in claim 9, wherein said plurality of third lenticular lenses are arranged to have a pitch equal to the pitch of said second lenticular lenses.

11. A screen as claimed in claim 12, wherein said plurality of third lenticular lenses are respectively disposed at the bottom of grooves formed between said plurality of black stripes.

12. A screen as claimed in claim 9, wherein said third lenticular lenses are smaller in width than said second lenticular lenses.

* * * * *